US007896041B2

(12) United States Patent
Becker et al.

(10) Patent No.: US 7,896,041 B2
(45) Date of Patent: Mar. 1, 2011

(54) DUST COLLECTION ATTACHMENT

(75) Inventors: Bradley David Becker, Buffalo, MN (US); Steve Krohmer, Coon Rapids, MN (US)

(73) Assignee: Rockler Companies, Inc., Medina, MN (US)

( * ) Notice: Subject to any disclaimer, the term of this patent is extended or adjusted under 35 U.S.C. 154(b) by 641 days.

(21) Appl. No.: 11/670,816

(22) Filed: Feb. 2, 2007

(65) Prior Publication Data

US 2008/0185072 A1    Aug. 7, 2008

(51) Int. Cl.
B27G 19/00 (2006.01)
B24B 55/06 (2006.01)

(52) U.S. Cl. .............. 144/252.2; 409/137; 451/456

(58) Field of Classification Search ........... 144/251.1, 144/252.1, 252, 252.2; 83/100; 15/256.3, 15/340.3, 340.4; 409/137; 408/68; 451/451, 451/453, 456
See application file for complete search history.

(56) References Cited

U.S. PATENT DOCUMENTS

| 2,253,349 | A | * | 8/1941 | Pullen | 15/41.1 |
|---|---|---|---|---|---|
| 2,625,698 | A | * | 1/1953 | De Kadt Maurits et al. | 15/45 |
| 3,837,383 | A | * | 9/1974 | Ko | 144/251.2 |
| 4,765,099 | A | * | 8/1988 | Tanner | 451/359 |
| 4,821,365 | A | * | 4/1989 | Charters | 15/339 |
| 4,899,495 | A | | 2/1990 | Attinger et al. | |
| 4,905,421 | A | | 3/1990 | Maier et al. | |
| 5,410,776 | A | * | 5/1995 | Schneider | 15/398 |
| 5,850,669 | A | | 12/1998 | Schupp et al. | |
| 6,052,865 | A | | 4/2000 | Schwarze et al. | |
| 6,643,894 | B1 | * | 11/2003 | Dell | 15/385 |
| D573,615 | S | * | 7/2008 | McDaniel | D15/138 |
| 7,434,604 | B2 | * | 10/2008 | McDaniel et al. | 144/48.5 |
| 7,455,089 | B2 | * | 11/2008 | McDaniel et al. | 144/144.1 |
| 2005/0013674 | A1 | | 1/2005 | Vidal | |
| 2006/0042440 | A1 | * | 3/2006 | Quinlan | 83/100 |

* cited by examiner

Primary Examiner—Shelley Self
(74) Attorney, Agent, or Firm—Altera Law Group, LLC

(57) ABSTRACT

A dust collection attachment is disclosed that is adapted to be coupled to a base. A barrier coupled to the pan includes a plurality of bristles that create an opening to the pan between the base and the barrier in order to prevent debris generated by a tool from passing through the barrier, yet allowing passage of the tool through the barrier.

9 Claims, 4 Drawing Sheets

DUST COLLECTION ATTACHMENT

BACKGROUND

Woodworking involves use of various tools such as cutting tools, drilling tools and sanding tools that generate a substantial amount of debris, commonly in the form of dust. One cutting tool that can generate a substantial amount of debris is a router. A router generally includes a rotating bit used to remove a portion of wood from a wood piece. In one situation, the router is used in combination with a dovetail jig that guides the router when forming grooves known as "dovetails". Dovetails are generally used to lock pieces of wood together at a corner. Current dust collection devices have difficulty collecting debris from a router when used in combination with a dovetail jig.

SUMMARY

A dust collection attachment is disclosed that is adapted to be coupled to a base. The attachment includes a pan adapted to be coupled to the base. A barrier coupled to the pan includes a plurality of bristles that create an opening to the pan between the base and the barrier in order to prevent debris generated by a tool from passing through the barrier.

A combination is also disclosed that includes a base having a jig for use with a cutting tool. A dust collection attachment having a pan is mounted to the base and a barrier is coupled to the pan. The barrier includes a plurality of bristles having a portion spaced apart from the base to guide debris generated by the cutting tool to the pan.

A method of guiding debris from a workpiece generated by a cutting tool is also disclosed. The method includes providing a barrier having an opening spaced apart from a base and allowing the cutting tool to pass through the barrier while preventing debris from passing through the barrier.

This Summary is provided to introduce a selection of concepts in a simplified form that are further described below in the Detailed Description. This Summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE FIGURES

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

DETAILED DESCRIPTION

Figure 1:
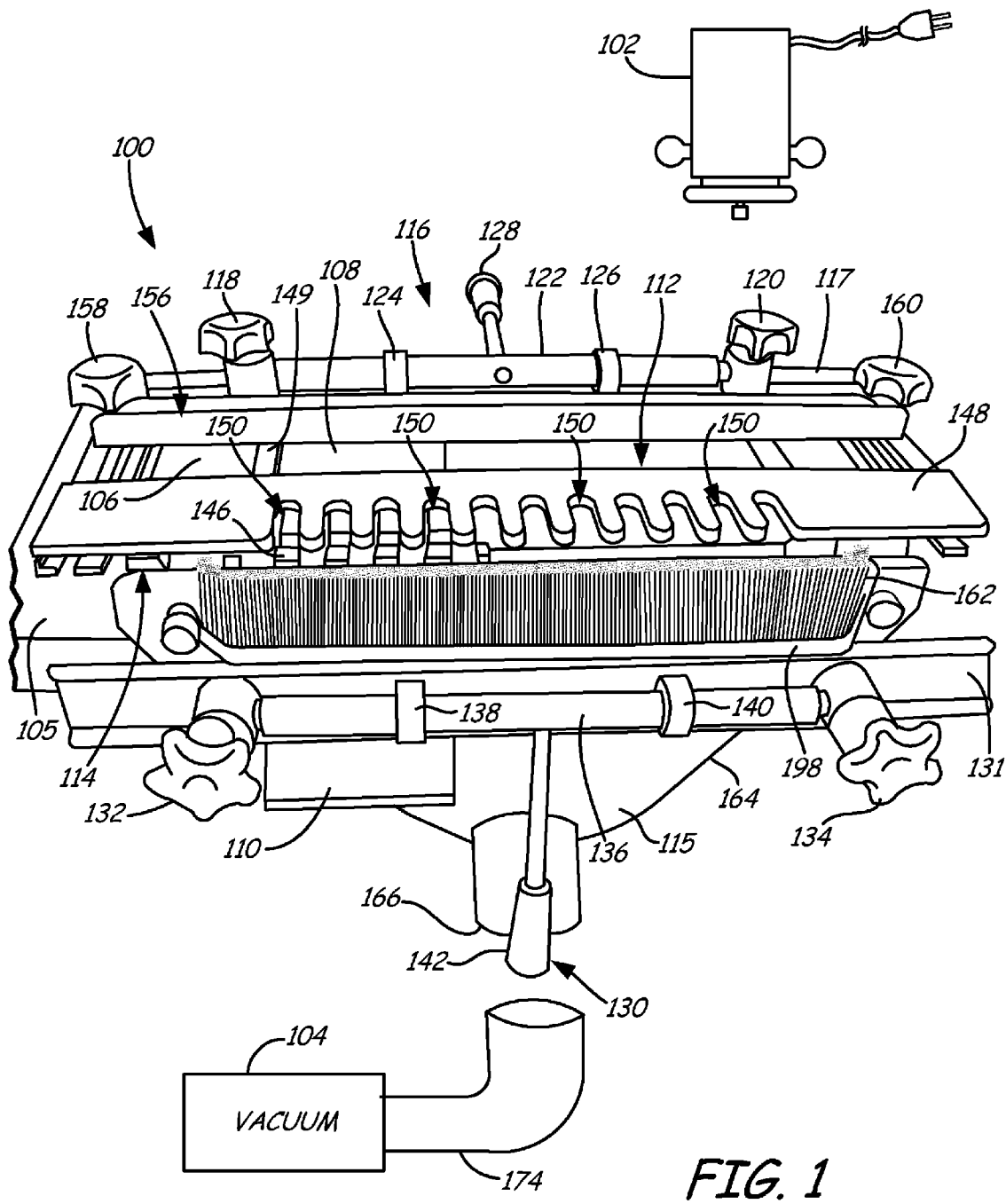
FIG. 1 is an isometric view of an environment utilizing a dovetail jig.

FIG. 1 is an environment having a dovetail jig 100, a router 102 and a vacuum 104. Dovetail jig 100 is mounted to a work bench or table 105 and includes a base or frame 106 adapted to hold a first piece of wood 108 orthogonal with respect to a second piece of wood 110. Wood piece 108 is held on a top surface 112 of base 106 while wood piece 110 is held on a front surface 114 of base 106. Router 102 includes a router bit that is used to cut grooves in wood pieces 108 and 110 while being held on base 106. A dust collection attachment 115 is coupled to dovetail jig 100 in order to direct cut wood debris from router 102 to vacuum 104. Although router 102 is illustrated as being a hand-held router, a table router in which the router bit is fixed to a table can also be used.

A first clamping mechanism 116 is used to clamp wood piece 108 to top surface 112. Clamping mechanism 116 includes a plate 117, first knob 118, a second knob 120, a bar 122, a first cam 124, a second cam 126 and a lever 128. Knobs 118 and 120 include threaded fasteners that engage threaded apertures in base 106. To secure wood piece 108 to top surface 112, wood piece 108 is placed between the plate 117 and top surface 112. Knobs 118 and 120 can be adjusted (i.e., loosened and tightened) to alter clearance of plate 117 with respect to top surface 112. Once knobs 118 and 120 are tightened against plate 117 that bears on wood piece 108, actuation of lever 128 forces cams 124 and 126 to place additional pressure on plate 117, and subsequently wood piece 108 to hold wood piece 108 against surface 112.

Dovetail jig 100 also includes a second clamping mechanism 130 adapted to hold wood piece 110 with respect to front surface 114. Similar to clamping mechanism 116, clamping mechanism 130 includes a plate 131, a first knob 132, a second knob 134, bar 136, first cam 138, second cam 140 and a lever 142. Knobs 132 and 134 include threaded fasteners that engage threaded apertures in base 106. In addition to holding wood piece 110 with respect to front surface 114, clamping mechanism 130 holds attachment 115 with respect to front surface 114. As such, knobs 132 and 134 are tightened to apply pressure through plate 131 to wood piece 110 and attachment 115. Actuation of lever 142 applies additional pressure through cams 138 and 140 to bar 136.

Figure 2:
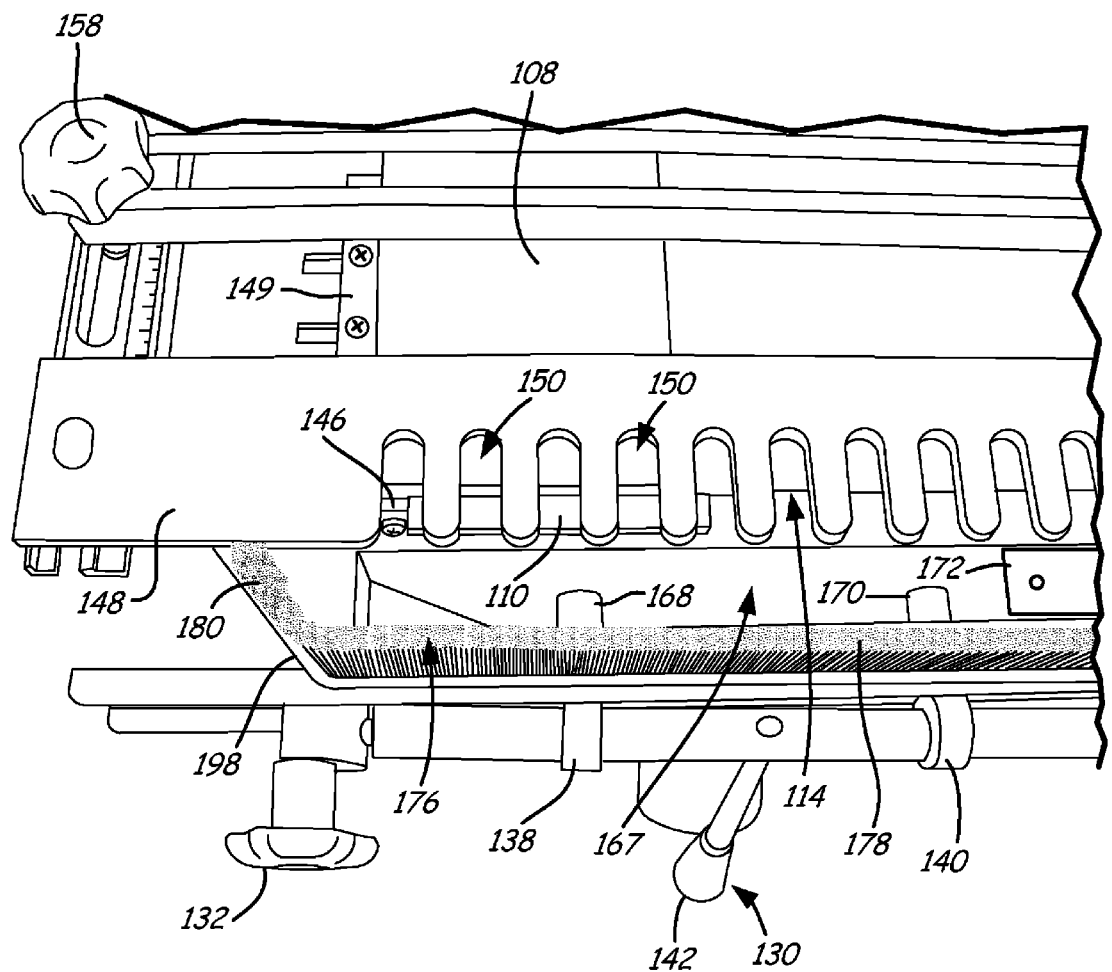
FIG. 2 is a top view of the dovetail jig of FIG. 1.

With further reference to FIG. 2, during operation, router 102 is used to cut groves, referred to as dovetails, in wood pieces 108 and 110. A positioning block 146 and jig plate 148 are used to position wood piece 110. A side edge of wood piece 110 abuts against positioning block 146 and a top edge of wood piece 110 abuts a bottom side of jig plate 148 and the wood piece 110 is then is clamped in place using clamping mechanism 130. Then, a front edge of wood piece 108 is positioned to abut wood piece 110 and a side edge of work piece 108 abuts a fence 149 in order to be positioned for clamping in place using clamping mechanism 116. Jig plate 148 is used to guide router 102 using a plurality of groves 150. Additionally, an overtravel stop 156 on the jig 100 (including adjustable knobs 158 and 160) is used to limit travel of router 102 while cutting wood pieces 108 and 110.

Figure 4:
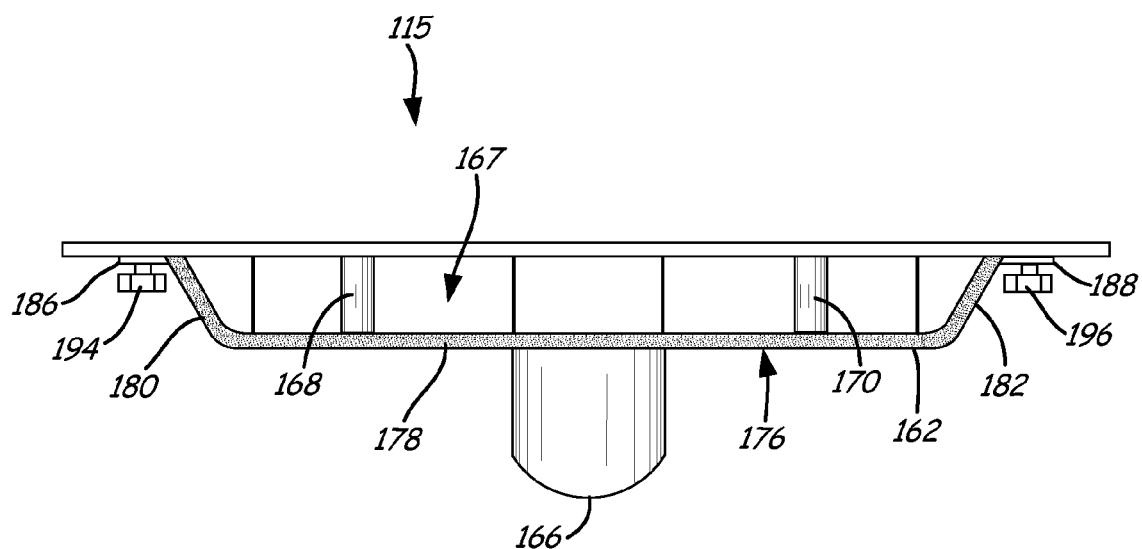
FIG. 4 is a top view the dust collection attachment of FIG. 3.

Attachment 115 includes a barrier 162, a pan 164 and an outlet 166 used to guide debris created from cutting wood pieces 108 and 110 with router 102. As seen in FIGS. 2 and 4, barrier 162 creates an opening 167 to pan 164. As illustrated in FIG. 2, attachment 115 can also include support posts 168 and 170 to provide a load path from cams 138 and 140, respectively, to front surface 114 of base 106. Additionally, attachment 115 can include a partial cover 172 to cover a portion of opening 167 and guide debris toward pan 164. The cover 172 may be removable and/or may be slidable relative to the opening 167 to permit changes in the size or position of the opening 167 relative to the pan 114. Outlet 166 can be coupled to a tube 174 that is coupled to vacuum 104.

Figure 3:
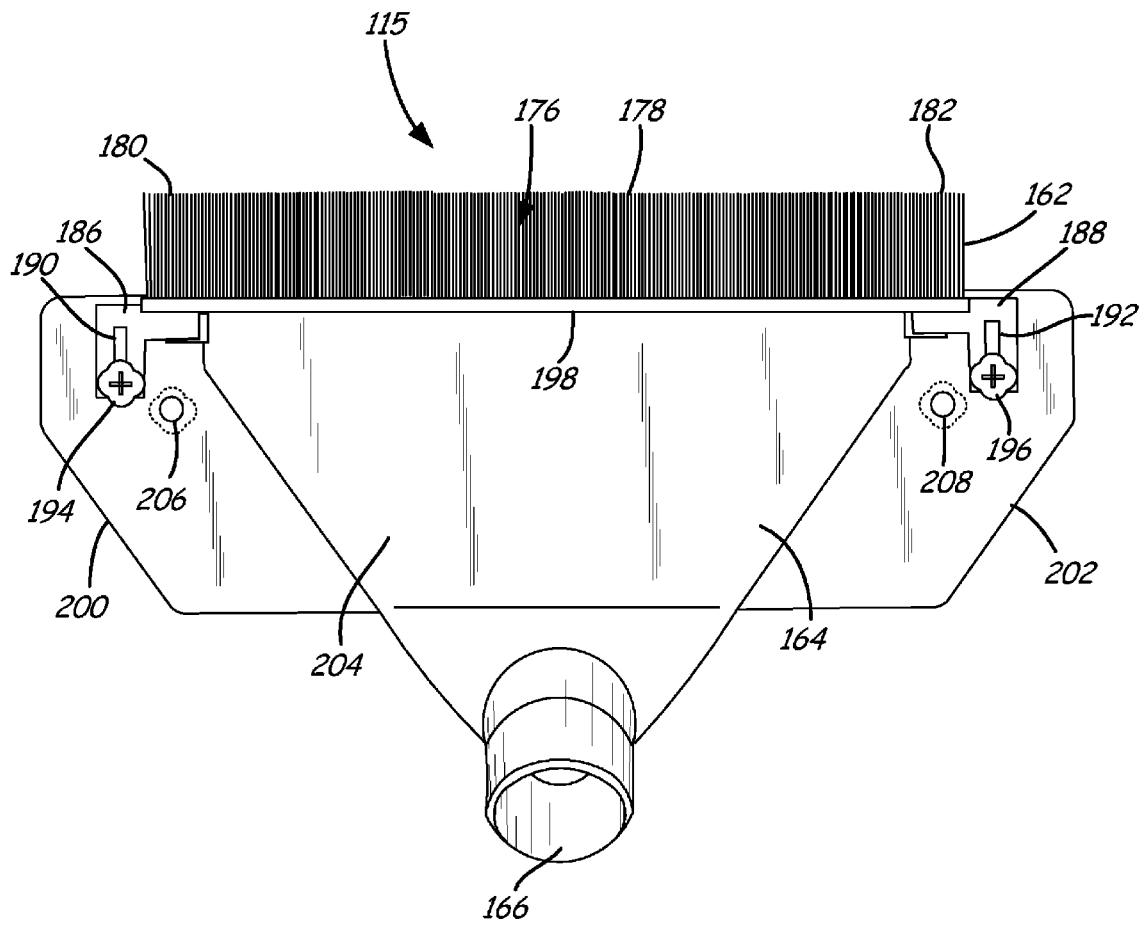
FIG. 3 is a front view of a dust collection attachment.

FIGS. 3 and 4 illustrate a front view and a top view, respectively, of dust collection attachment 115. Barrier 162 includes a plurality of flexible bristles 176 of generally uniform height that are arranged in a u-shaped manner. With reference to FIGS. 1-4, the plurality of bristles 176 include a main portion 178 and two side portions 180 and 182 angled toward base 106. Main portion 178 is spaced apart from base 106 to create opening 167 to pan 164. The plurality of bristles 176 allow a router bit of router 102 to pass therethrough but prevent debris generated by router 102 from passing therethrough. In preventing debris from passing therethrough, the plurality of bristles 176 guide debris towards pan 164 through opening 167.

Barrier 162 also includes a first tab 186 and a second tab 188. Tab 186 includes a slot 190 and tab 188 includes a slot 192. Barrier 162 can be positioned to a desired height with respect to pan 164 by adjusting knobs 194 and 196, respectively. When barrier 162 is positioned at a desired height, knobs 194 and 196 can be tightened. For example, a top of barrier 162 can be aligned with (i.e., on the same plane as) a top side of jig plate 148. Barrier 162 can also include a lip 198 that holds the plurality of bristles 176 and can rest on plate 131 of clamping mechanism 130. Pan 164 includes a first plate portion 200, a second plate portion 202 and a funnel 204. First plate portion 200 includes a first aperture 206 and second plate portion 202 includes a second aperture 208. The apertures 206, 208 accommodate knobs 132, 134, respectively. Knobs 132 are thus used as fasteners to secure attachment 115 to base 106. However, other types of fasteners can be used to secure attachment 115 to base 106, such as screws, clamps, nails, adhesives, etc. Funnel 204 directs debris towards outlet 166.

Although the subject matter above has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A combination, comprising:
   a base having a jig for use with a cutting tool; and
   a dust collection attachment having a pan mounted to the base and a barrier coupled to the pan having a plurality of bristles including a portion spaced apart from the base to guide debris generated by the cutting tool to the pan, wherein the plurality of bristles allow the cutting tool to pass therethrough and prevent debris generated by the cutting tool from passing therethrough and wherein the base includes a clamping mechanism adapted to hold the dust collection attachment relative to the base and wherein the clamping mechanism comprises:
   a bar operatively coupled to the base; a lever operatively coupled to the bar; and
   first and second cams operatively coupled to the bar on opposite sides of the lever; and
   the dust collection attachment comprises:
   a first support post operatively coupled between the first cam and the base; and
   a second support post operatively coupled between the second cam and the base,
   the first and second support posts being configured to provide load paths between the first and second cams and the base.

2. A combination of claim 1 wherein the barrier is adjustable to a plurality of positions with respect to the pan.

3. A combination of claim 1 wherein the plurality of bristles further include two side portions angled toward the base.

4. A combination of claim 1 and further comprising an outlet coupled to the pan, the outlet being adapted to be coupled to a tube.

5. A combination of claim 4 wherein the pan further includes a funnel, a first aperture and a second aperture, the first and second apertures adapted to receive a fastener for coupling the pan to the base, wherein the first aperture and the second aperture are positioned on opposite sides of the funnel and wherein the funnel directs debris from the barrier to the outlet.

6. A combination of claim 1 and further comprising a cover adjustable with respect to the barrier to at least partially cover the barrier.

7. The combination of claim 1 wherein the clamping mechanism is further adapted to hold a first work piece relative to the base and wherein the base includes a second clamping mechanism adapted to hold a second work piece orthogonal to the first work piece.

8. The combination of claim 1 wherein the pan further includes a first aperture and a second aperture adapted to receive a first fastener and second fastener, respectively, and a funnel wherein the first aperture and the second aperture are positioned on opposite sides of the funnel.

9. The combination of claim 1 and further comprising a vacuum and a tube connecting the vacuum and the dust collection attachment.

* * * * *